US007980511B2

(12) United States Patent
Janboecke et al.

(10) Patent No.: US 7,980,511 B2
(45) Date of Patent: Jul. 19, 2011

(54) DEVICE FOR THE TRANSPORT AND MEDICAL CARE OF PATIENTS AS WELL AS FOR THE PROVISION OF EMERGENCY MEDICAL CARE IN AN AIRCRAFT

(75) Inventors: Sarah Janboecke, Essen (DE); Matthias Kierysch, Neuss (DE); Oliver Doebertin, Hamburg (DE); Florian Schmidt, Ahrensburg (DE); Werner Granzeier, Jork (DE)

(73) Assignee: Airbus Deutschland GmbH (DE)

( * ) Notice: Subject to any disclaimer, the term of this patent is extended or adjusted under 35 U.S.C. 154(b) by 714 days.

(21) Appl. No.: 12/072,902

(22) Filed: Feb. 27, 2008

(65) Prior Publication Data

US 2008/0250559 A1    Oct. 16, 2008

Related U.S. Application Data

(60) Provisional application No. 60/903,628, filed on Feb. 27, 2007.

(30) Foreign Application Priority Data

Feb. 27, 2007    (DE) .......................... 10 2007 009 544

(51) Int. Cl.
    *B64D 11/00*    (2006.01)
(52) U.S. Cl. .......................... 244/118.5; 296/19; 105/319
(58) Field of Classification Search ............... 244/118.1, 244/118.5, 118.6; 105/319, 323; 296/19
    See application file for complete search history.

(56) References Cited

U.S. PATENT DOCUMENTS

| 4,115,885 | A |   | 9/1978 | Davis |
| 4,458,864 | A |   | 7/1984 | Colombo et al. |
| 4,783,025 | A | * | 11/1988 | Moffett ..................... 244/118.5 |
| 4,957,121 | A | * | 9/1990 | Icenogle et al. .......... 244/118.5 |
| 5,083,727 | A |   | 1/1992 | Pompei et al. |
| 5,535,964 | A | * | 7/1996 | Ahlsten ..................... 244/118.5 |

(Continued)

FOREIGN PATENT DOCUMENTS

| EP | 885604 A2 | 12/1998 |
| EP | 1138304 | 10/2001 |
| EP | 1209078 | 5/2002 |
| WO | 2006/134252 | 12/2006 |

OTHER PUBLICATIONS

Lufthansa PTC Patient transport Compartment http://www.Lufthansa.com/ online/portal/lh/us/info and-services/travel-.

*Primary Examiner* — Galen Barefoot
(74) *Attorney, Agent, or Firm* — Lerner, David, Littenberg, Krumholz & Mentlik, LLP

(57) ABSTRACT

A device for the transport and medical care of patients as well as for the provision of emergency medical care in an aircraft, which can be arranged and permanently installed inside the passenger cabin of an aircraft, and has a stretcher and medical care equipment, and screens the patient from the environment at least partially by means of lateral elements. The device is enveloped on all sides by lateral elements, and forms a separated compartment relative to the passenger cabin, the volume of which can be temporarily enlarged by shifting at least one lateral section between the first, emergency medical care mode, and a second, expanded mode for patient transport, wherein the stretcher can be horizontally arranged within the compartment in the first mode, and space is available for a medical assistant inside the compartment.

19 Claims, 18 Drawing Sheets

U.S. PATENT DOCUMENTS

| | | |
|---|---|---|
| 5,755,478 A * | 5/1998 | Kamiya et al. .................. 296/19 |
| 5,964,065 A * | 10/1999 | Migurski et al. .................. 52/64 |
| 6,007,025 A | 12/1999 | Coughren et al. |
| 6,273,366 B1 | 8/2001 | Sprenger et al. |
| 6,604,709 B1 * | 8/2003 | Wentland et al. .......... 244/118.5 |
| 6,615,421 B2 * | 9/2003 | Itakura ....................... 244/118.5 |
| 6,691,952 B2 | 2/2004 | Keogh |
| 7,549,606 B2 * | 6/2009 | Quan .......................... 244/118.5 |
| 2005/0001097 A1 | 1/2005 | Saint-Jalmes |
| 2006/0060704 A1 | 3/2006 | Lavie et al. |

\* cited by examiner

DEVICE FOR THE TRANSPORT AND MEDICAL CARE OF PATIENTS AS WELL AS FOR THE PROVISION OF EMERGENCY MEDICAL CARE IN AN AIRCRAFT

CROSS-REFERENCE TO RELATED APPLICATIONS

This application claims the benefit of the filing date of U.S. Provisional Patent Application No. 60/903,628 filed Feb. 27, 2007, the disclosure of which is hereby incorporated herein by reference.

BACKGROUND OF THE INVENTION

The present invention relates to a device for the transport and medical care of patients, as well as for the provision of emergency medical care in an aircraft, which device can be arranged and permanently installed inside the passenger cabin of an aircraft, has a stretcher and medical care equipment, and shields the patient from the environment at least with lateral elements.

Rising passenger numbers, longer flight times and worldwide demographic development is imparting more and more importance to providing care to collapsed passengers on board a passenger aircraft, i.e., emergency medical care. The return of injured tourists from abroad to their home countries is taking on a more essential role as well. Devices for transporting and providing emergency medical care to patients are known in different variants. The simple variants are characterized in that they only provide a stretcher for emergency cases, on which a patient is placed lying down. For example, U.S. Pat. No. 6,691,952 B2 describes a stretcher that is secured to a substructure carried between the passenger seats, wherein the stretcher runs across the seat backrest. When not in use, the stretcher is stowed in a kind of cabinet. The fundamental problem lies in the fact that as little space as possible should be taken up for patient transport on the one hand, while the patient should also be shielded away form the other passengers to some extent on the other. Known to this end from U.S. Pat. No. 6,237,366 B1 is a device in which the patient is pushed onto a stretcher partially in a compartment used as a toilette as the remaining passengers board and disembark. In order to use the toilette during flight, the stretcher is removed from the WC compartment, and then projects into the space in front of the aircraft entry. In another variant, e.g., the so-called FTI (Airbus A380), a cot is folded out of a type of cabinet into the aisle in an emergency. Since the described solutions provide little if any shielding for the patient relative to the other passengers, and can also often impair flight operations, these solutions are used very rarely, if at all, for the return transport of patients. Therefore, solutions involving a sealed room are used for the return transport of patients. Smaller aircraft equipped for these types of flights are most often involved. An autarchic unit is here most frequently used for providing medical care in the aircraft or helicopter, e.g., in U.S. Pat. No. 4,458,864. Also known is a patient transport compartment developed by Lufthansa Technik AG under the name Lufthansa PTC. However, before the latter can be built into an airliner, twelve passenger seats must first be removed. But this solution has proven to be associated with high costs and a high logistical outlay.

Therefore, the object of the present invention is to provide a simple and space-saving device that is suitable for providing immediate medical care in an emergency, and can be used for the return transport of a patient.

SUMMARY OF THE INVENTION

According to the invention, the object is achieved by a device of the kind mentioned at the outset, which is enveloped on all sides by lateral elements, and forms a separated compartment relative to the passenger cabin, the volume of which can be temporarily enlarged by shifting at least one lateral section between the first, emergency medical care mode, and a second, expanded mode for patient transport, wherein the stretcher can be horizontally arranged within the compartment in the first mode, and space is available for a medical assistant inside the compartment.

The advantage to the device according to the invention is that it is available for an emergency at any time, without disrupting flight operations or taking up already occupied seats. The self-contained compartment ensures a high level of emergency medical care, and does not inconvenience the other passengers. Only the space required by four normal seats is occupied in the neutral mode. The compartment can be enlarged for a return transport of a patient, so that sufficient space is available. As a result, airlines can also offer the patient return transport service even on normal flight routes. By covering the missing six seats by insurance, e.g., health or accident insurance, the system can be designed to be cost neutral with respect to patient return transport. The high level of emergency care translates into an enhanced image that should not be underestimated, and has a positive impact on lasting customer loyalty. The loss in seats is reduced to a minimum by a comprehensive system, without detracting from the necessary passenger, patient and user comfort.

In a preferred embodiment, the at least one lateral section is a translatorily movable pull-out element, and the stretcher is arranged parallel to the pull-out element, and can move in conjunction with the latter. Shifting the lateral wall on the longitudinal side of the compartment enlarges the area in front of the stretcher to the entire length of the stretcher, i.e., the area provided for the medical assistant or caregiver. Therefore, shifting the pull-out element improves primarily the spatial situation for the assistant. The shifting motion here represents a mechanism that is easy to realize, and simultaneously ensures an optimal utilization of the newly created space. The pull-out element is preferably designed with an inner rail system, and fits in with the overall configuration and design. The expansion option is provided for the planned return transport of patients. To this end, one seat per row of seats next to the compartment is removed. Technical personnel perform this process while the aircraft is parked. After the seats have been removed, the compartment can be expanded by one row of seats, i.e., by 514 mm, for example. Only two additional seats must be removed during installation in the longitudinal direction of the aircraft. As a consequence, only six normal seats are omitted for a planned return transport.

The at least one lateral section can preferably be latched in the expanded state. To this end, for example, retractable handles with pilot unlatching system are provided to ensure authorized use.

Further preferred is an embodiment in which the lateral elements can be secured to the structure of the aircraft, so that the flat elements can be as simple and cost effective in design as possible. Attachment to the aircraft structure enables the thinnest possible wall structures, which in turn minimizes the loss in space.

The device preferably has a ceiling element that can be secured to the structure of the aircraft, and has ports for power and/or oxygen supply, for an air conditioning unit and/or for data exchange, since the corresponding infrastructure lines are generally present in that aircraft location.

The stretcher is preferably equipped with a system of straps and belts for the patient, which enables unlimited resuscitation with patients strapped in. As a result, resuscitation measures can basically also be taken during episodes of turbulence, which may give rise to more emergency situations, such as cardiovascular disturbances. For example, a cardiac arrest in labile patients caused by strong turbulence can be treated immediately.

In an especially preferred embodiment, the patient strap and belt system comes in two parts. As a result, the patient can be securely fastened to the stretcher in the area of his or her legs or hip using one part of the belt system, while the other part of the belt system can be loose or even completely detached to allow the required resuscitation measures, during which the upper half of the body can usually not be tied to the stretcher.

The stretcher can preferably be continuously adjusted between a flat position for accommodating a prone patient and an upright position for accommodating a uprightly seated patient. As a result, the patient can assume as wide a range of different positions as possible, while at the same time being securely strapped to the stretcher. Primarily in the case of prolonged stays, e.g., during long-distance flights, this can spell an increased comfort for the patient as well as attending or treating persons, without having to forego the safety of the secured patient.

The stretcher with patient secured thereto can also be taken out of the compartment so that the patient can also be repositioned outside the aircraft. This facilitates the work of medical assistants, who can hoist the patient on and off the stretcher in an ambulance or first-aid facility at the airport, and no longer do so in the tight aircraft cabin. The loading time is also shortened, since the patient can already be prepared and secured to a readied stretcher before the aircraft arrives. Upon arrival of the aircraft, the patient then need only be moved onto the stretcher in the aircraft.

The stretcher is preferably secured to a substructure that has removable stowage areas for medical equipment. For example, the substructure here comprises various drawer systems that have removable drawer elements. This can involve emergency baggage for emergencies outside the compartment, for example. The contents are protected by interior covers, which can also be used for the carrying function on the one hand, and protect against unauthorized use on the other. Of course, the substructure also comprises various support surfaces, which can also be retractable in design. Also provided are stowage areas for medical devices. The devices are fixed in place in such a way as to be intuitively usable. For example, the substructure is also provided with four small oxygen bottles and interior ports for covered cables. The stowage areas offer sufficient room to accommodate medical equipment to provide adequate care in both emergencies and planned returns.

Further preferred is an embodiment in which an installation zone with fixation means for medical devices and with supply hookups for power, oxygen and/or data transfer is provided above the stretcher. As a result, the arrangement makes it possible to install and reliably secure the devices or utensils the case may require in direct proximity to the patient.

Another even more preferred embodiment provides a telemedical unit for communication and transmission of patient data. For example, the telemedical unit can be a so-called tablet PC for processing and displaying patient data for the medical assistant. Transmission of data to a ground station or hospital helps the onboard assistant, and enables the initiation of necessary measures for providing further care to the patient on the ground. The telemedical unit can preferably be removed for use on the seat of the attendant.

Since the device inside the cabin can be arranged in such a way as to omit a pair of storage compartments intended for normal passengers, the device is equipped with an overhead compartment that can be accessed from the passenger cabin. This pretty much balances out the space required.

A seat for accommodating a medical assistant inside the compartment is preferably provided to enable uninterrupted medical care and/or attention to the patient during the entire flight.

Access to the compartment can be gained by way of the side opposite the shiftable side, i.e., via the free longitudinal side, and hence also enables access with a wheelchair.

In order to separate the compartment created by the device from the remaining passenger cabin while simultaneously permitting access, a lateral element lying opposite the stretcher preferably has a first moving separating element that extends over a majority of the side. This is preferably a roller blind that provides a large opening and, when opened, i.e., rolled up, does not project into the room, wherein the opening process itself is also relatively quick. The roller blind isolates the patient, and potentially also the medical assistant, in an acute emergency situation, providing some measure of privacy.

The compartment interior further preferably has a second movable separating element that runs parallel to the side of the pull-out element and separates the stretcher and medical devices from the access area. The second separating element preferably also is a roller blind that isolates and protects the medical equipment when not in use. As a result, the first roller blind can basically stay open when not in use. Since the second roller blind covers the medical equipment, this creates a pleasant situation for the remaining passengers. Further, flight personnel can temporarily use the additional seat, e.g., during takeoff and landing, when the compartment is not being utilized.

In order to enable an added use for the airlines and improve the comfort of remaining passengers, the lateral elements can be expanded to include customer-oriented extra functions on their surface facing the passenger cabin. In this case, the lateral walls can accommodate or the wall structure can integrate various functions, such as a tissue dispenser.

One of the lateral elements preferably integrates a display visible from the passenger cabin, e.g., an information screen or display.

BRIEF DESCRIPTION OF THE DRAWINGS

An exemplary embodiment of the invention will be described in greater detail below based on the attached drawings. Shown on.

DETAILED DESCRIPTION

Figure 1:
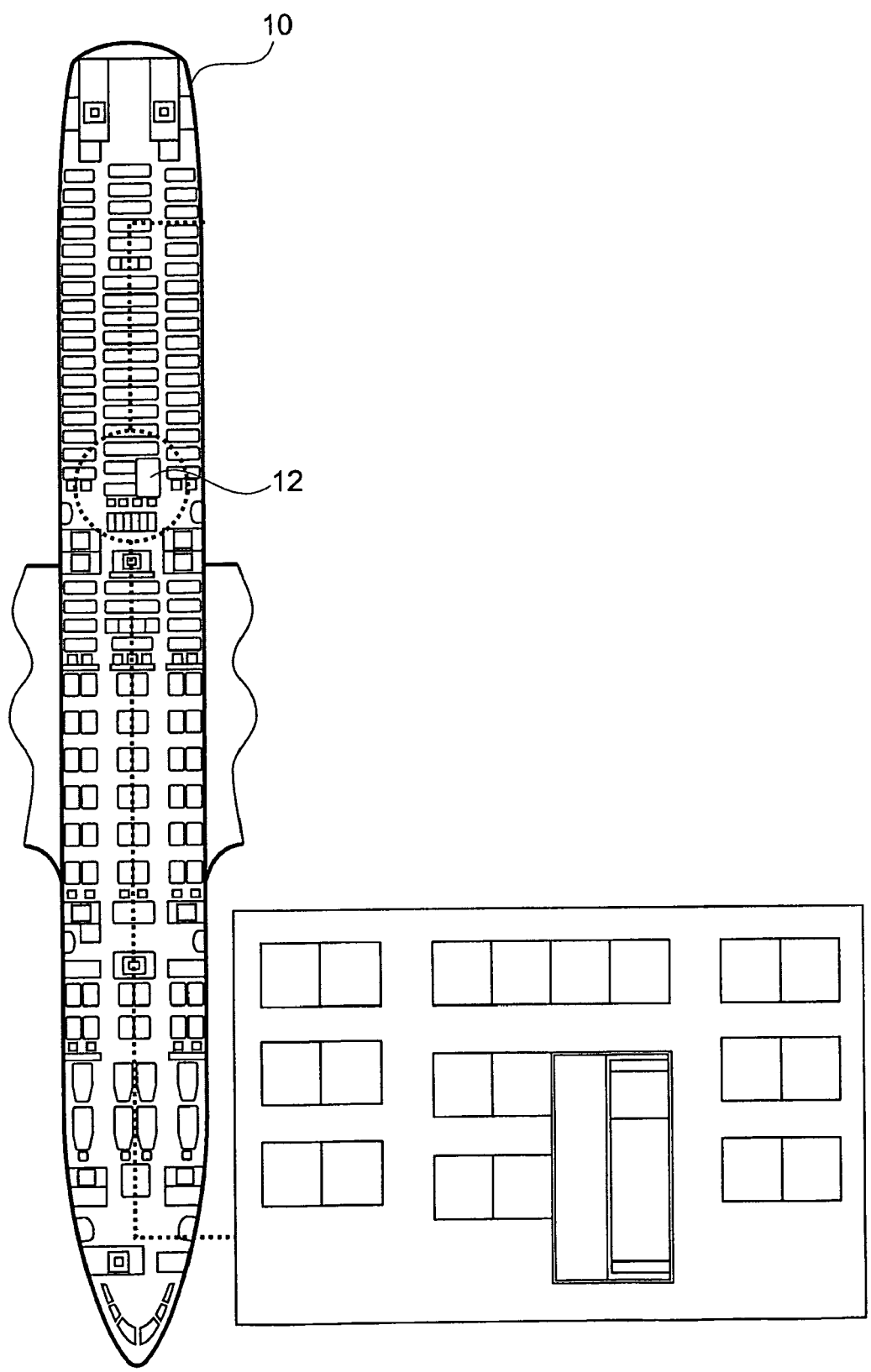
FIG. 1 is a schematic overview of the seat distribution in the fuselage of a passenger aircraft, viewed from the top, with a device for the transport and medical care of patients as well as the provision of emergency medical care situated centrally in the rear half of an aircraft, wherein an enlarged section with the seat is shown next to the fuselage.

FIG. 1 shows an example for a cabin layout of an Airbus A 340-300 type aircraft 10, wherein next to the fuselage a section is shown magnified. A device 12 for the transport and medical care of patients as well as for the provision of emergency medical care in an aircraft is arranged in the rear half at a crossway 14 (see also FIG. 2). The placement at a crossway permits a barrier-free transport of the patient. The device 12 is permanently installed inside the passenger cabin, and has a stretcher 16 and medical care devices. The device is provided on all side with lateral sections 18, 20, 22, 24, so that the interior is shielded form the environment, and forms a separate compartment.

Figure 2:
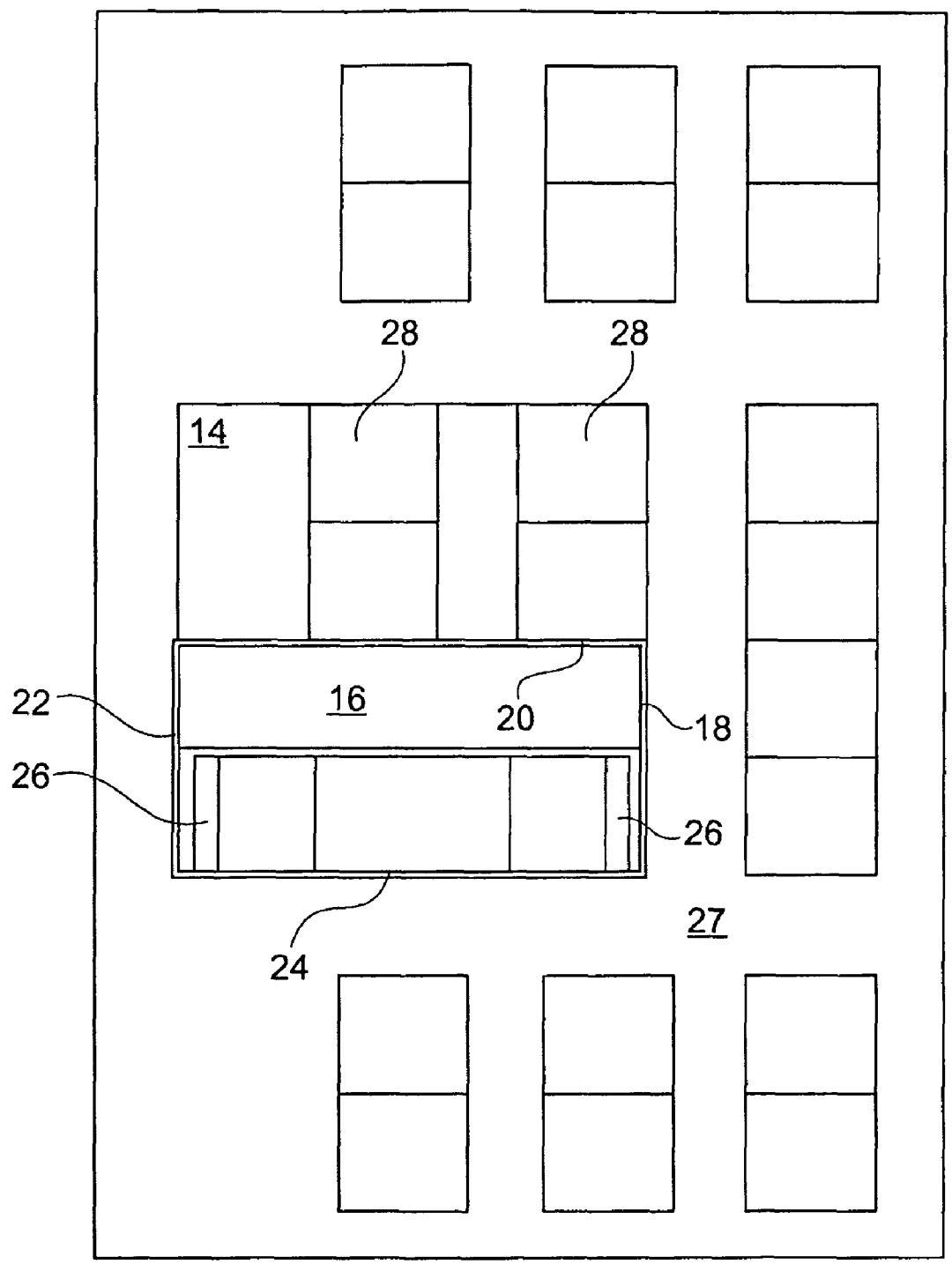
FIG. 2 is the magnified section from FIG. 1 with the device in a first mode.
Figure 3:
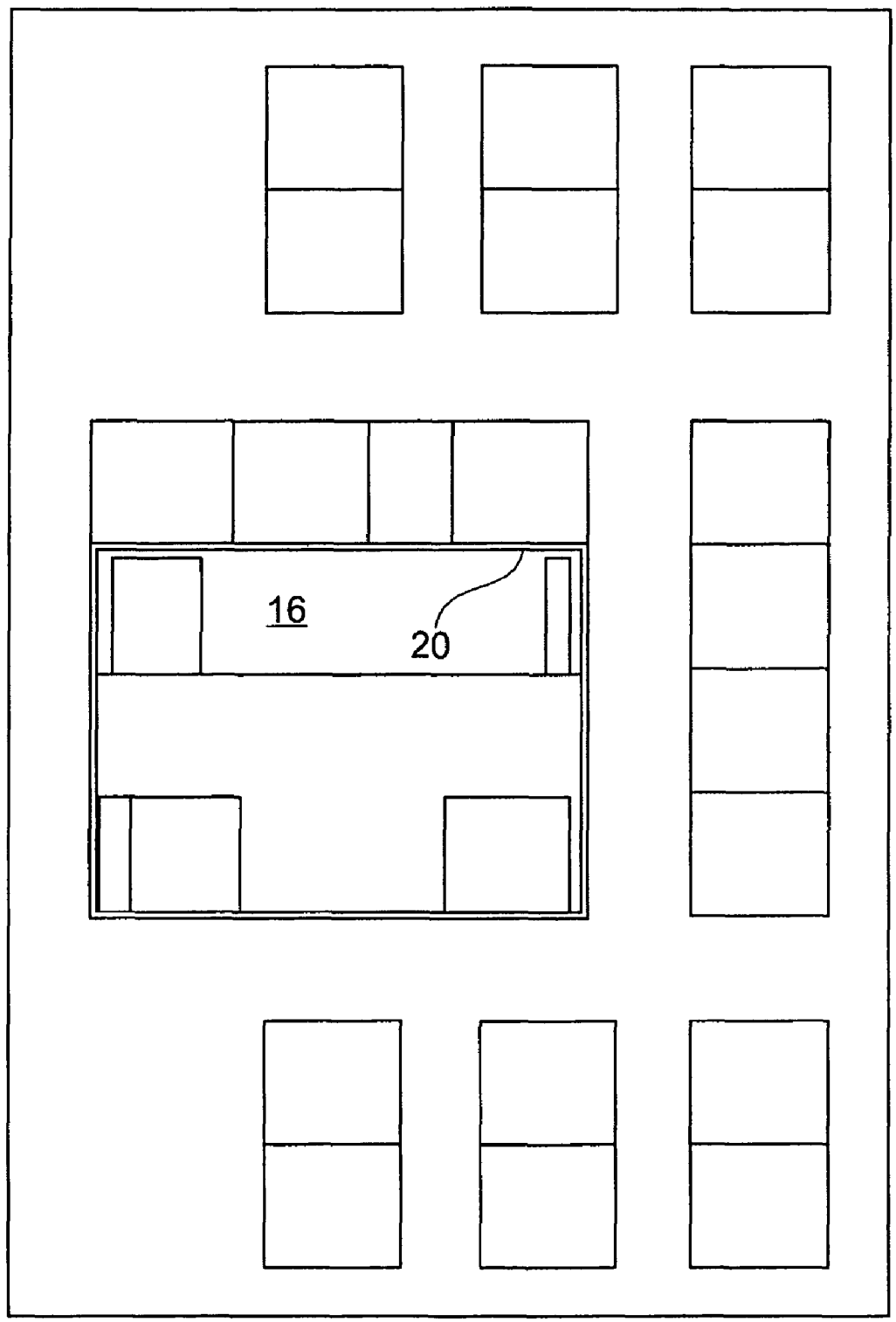
FIG. 3 is the device according to FIG. 2 in a second, expanded mode.

By shifting the lateral section 20 running parallel to the stretcher 16, the volume of the device can be temporarily enlarged from a first mode for emergency medical care shown on FIG. 2 to a second, expanded mode for patient transport shown on FIG. 3.

Figure 4:
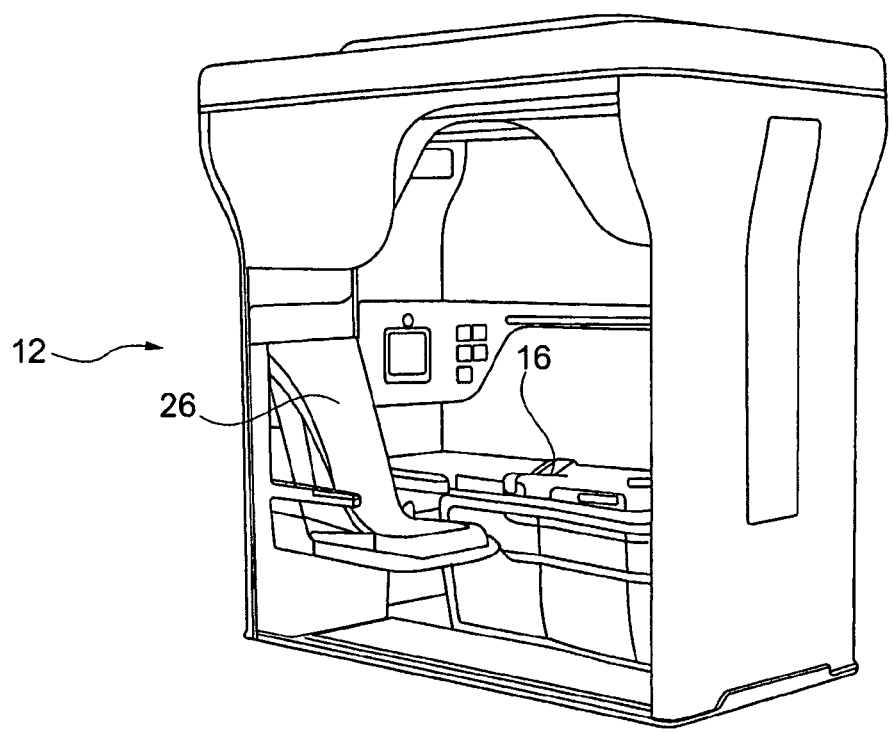
FIG. 4 is the device from FIG. 2 in a perspective view.

The stretcher 16 can be horizontally arranged inside the compartment in the first mode. In addition, space is available for a medical assistant within the compartment in the first mode. To this end, two seats 26 are provided next to the stretcher 16. Access to the compartment is gained via the side 22 lying opposite the shiftable side 20, which can be opened wide for this purpose, as shown on FIG. 4, i.e., access takes place via a longitudinal aisle 27.

Figure 5:
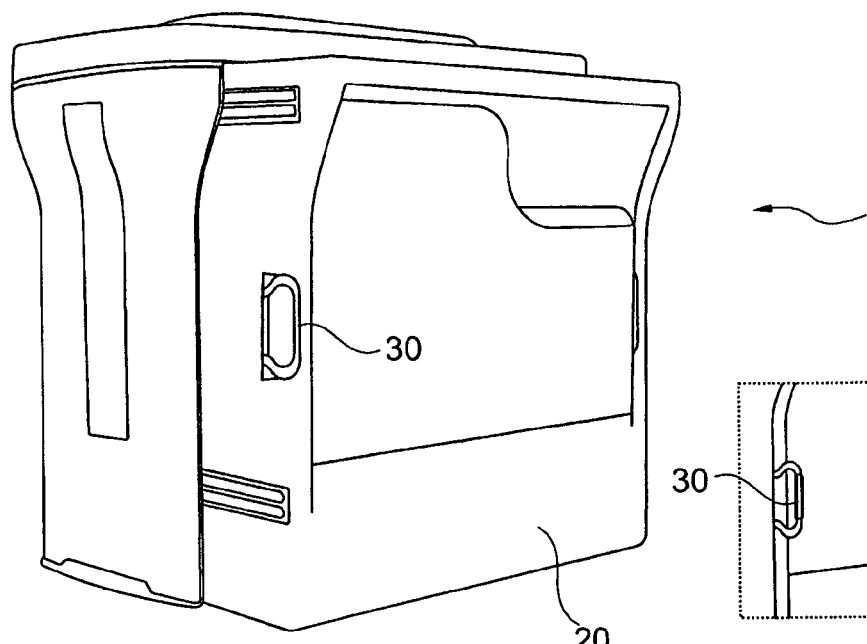
FIG. 5 is the device according to FIG. 4 in another perspective view in the expanded mode.
Figure 6:
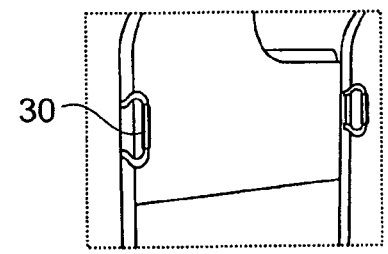
FIG. 6 is a section from FIG. 5 with retractable handles.
Figure 7:
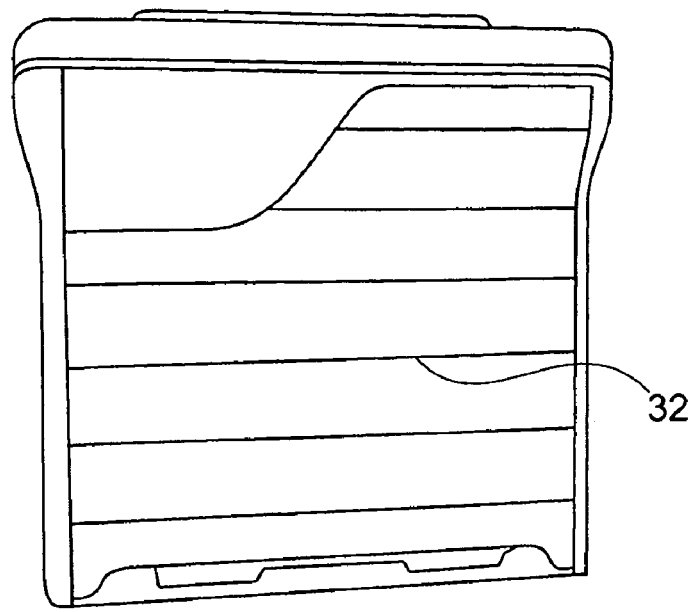
FIG. 7 is another perspective view of the device with an unrolled first separating element.
Figure 8:
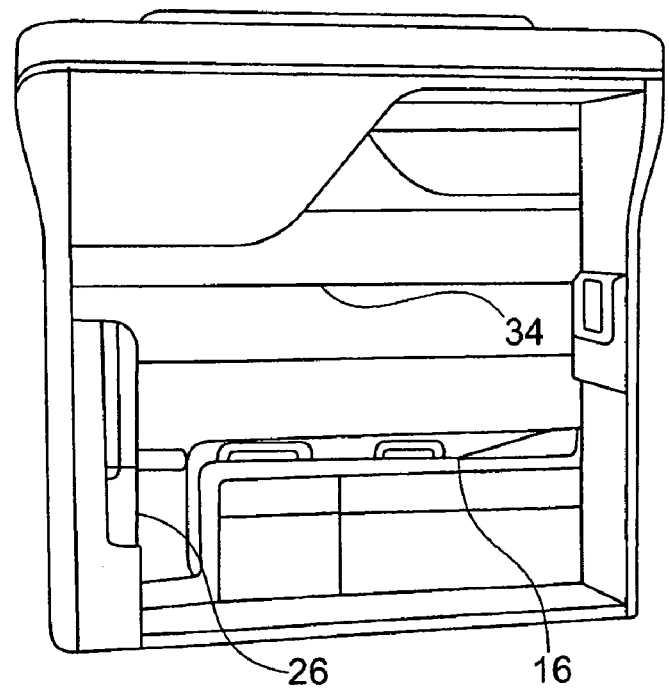
FIG. 8 is the perspective view according to FIG. 7, with the unrolled second separating element and rolled-up first separating element.

For purposes of expansion, the lateral section 20 designed as a translatorily movable pull-out element is removed like a shelf from the device, as may be seen from FIG. 5. Because the device 12 does not extend into the crossway 14 or longitudinal aisle 27 in the expanded mode, onboard services are never impeded. In addition, the stretcher 16 is also arranged completely inside the compartment even in a horizontal position, so that a patient located on the stretcher 16 does not get in the way of boarding or disembarking passengers. Further, the stretcher 16 does not have to be moved for boarding and disembarking.

The device 12 is provided with an interior rail system (not shown) to enable movement with as little exertion as possible. To this end, retractable handles 30 are provided with a pilot unlatching system to ensure authorized use. The two seats 28 next to the lateral section 20 must first be disassembled prior to expansion. The lateral section 20 is latched in the expanded state.

In order to separate the interior of the device 12 on the access side, i.e., in the area of lateral section 24, relative to the passenger cabin, a first movable separating element 32 is provided, which extends over a majority of the side, and is designed as a roller blind. Provided inside the compartment is a second movable separating element 34, which runs parallel to the side of the pull-out element 20, and separates the stretcher 16 from the access area. The second separating element 34 is also designed as a roller blind.

Figure 9:
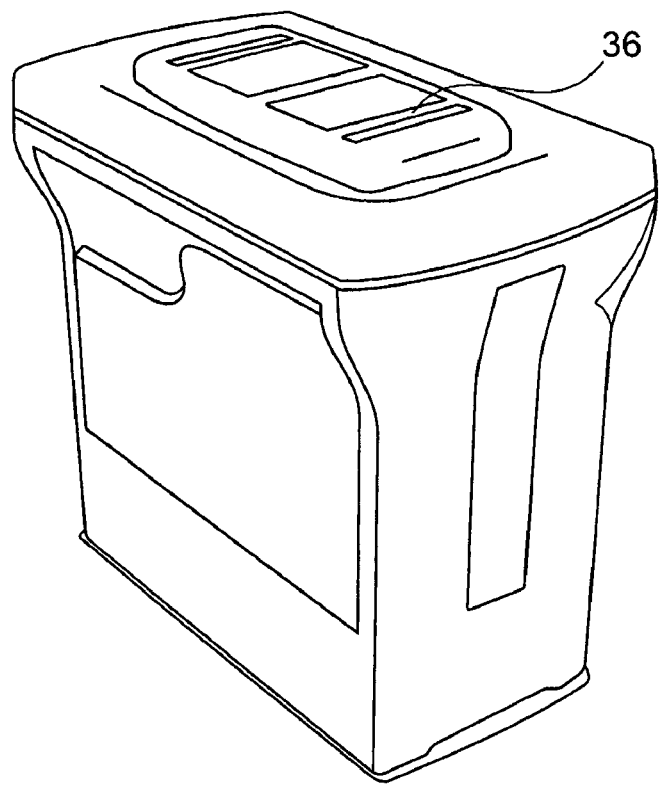
FIG. 9 is the device according to the invention in another perspective view.

The lateral elements 18, 20, 22, 24 are secured to the structure of the aircraft. Connection both to the power and/or oxygen supply and to the onboard data network takes place via a cover element 36 that is secured to the structure of the aircraft (see FIG. 9). The device 12 is modular in design, so that the system can be rapidly removed, e.g., to increase the number of seats.

Figure 10:
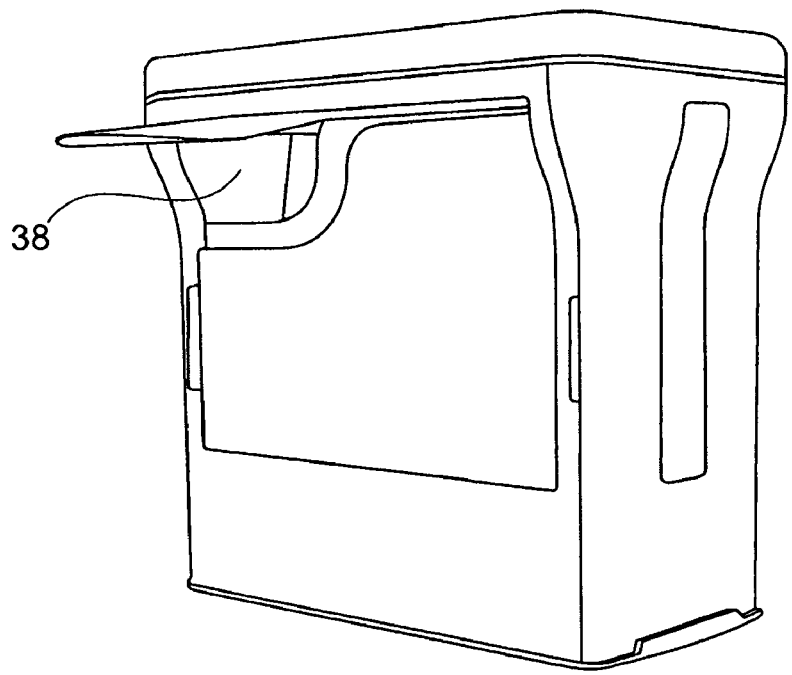
FIG. 10 is the device in another perspective view with a flipped open overhead storage compartment.

Since a pair of overhead compartments arranged in the central area are omitted during installation of the device 12, an overhead compartment 38 is provided in the upper area of the device 12, which can be accessed from the passenger cabin, and is shown opened on FIG. 10.

Figure 11:
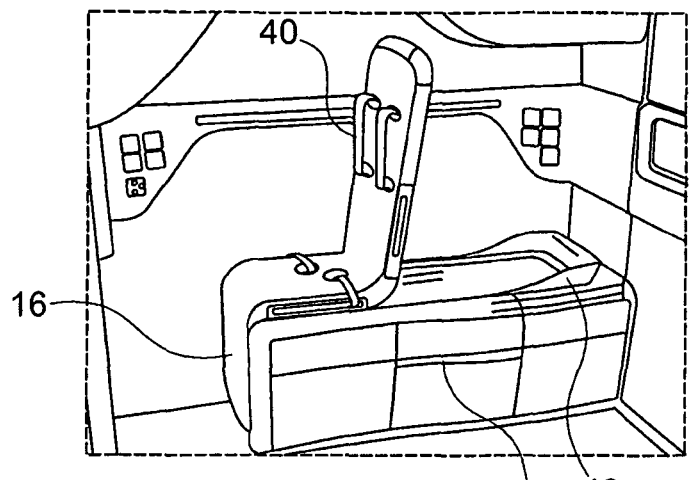
FIG. 11 is the inside of the device with a folded-up stretcher.
Figure 12:
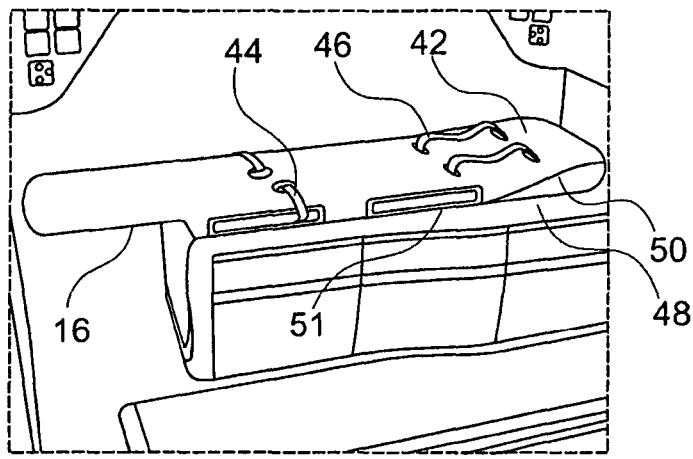
FIG. 12 is the stretcher according to FIG. 11 in a horizontal position.
Figure 13:
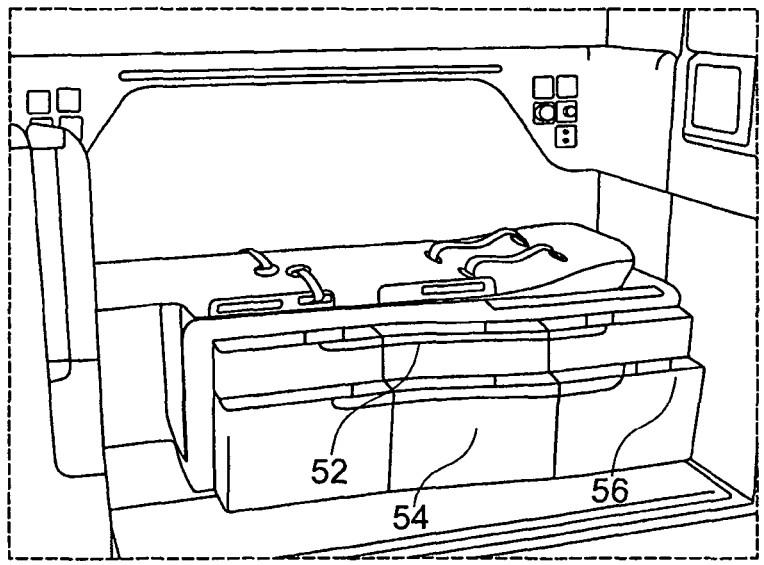
FIG. 13 is the substructure of the stretcher with removable storage facilities.

The stretcher 16 can be continuously adjusted between an upright position 40 to accommodate an uprightly seated patient (see FIG. 11) and a flat position 42 to accommodate a prone patient (see FIG. 12). The stretcher 16 is equipped with a two-part patient belt and strap system 44, 46, which permits unlimited resuscitation with patients strapped in. The stretcher 16 is designed in such a way that it can be carried out of the compartment with a patient strapped thereto. To this end, it has a carrying frame 48, which is secured to a substructure 50 in corresponding detachable mounts (not shown). Retractable latching handles 51 are provided for this purpose. The substructure 50 has differently designed, removable storage means 52, 54, 56 for medical equipment (see FIG. 13).

Figure 14:
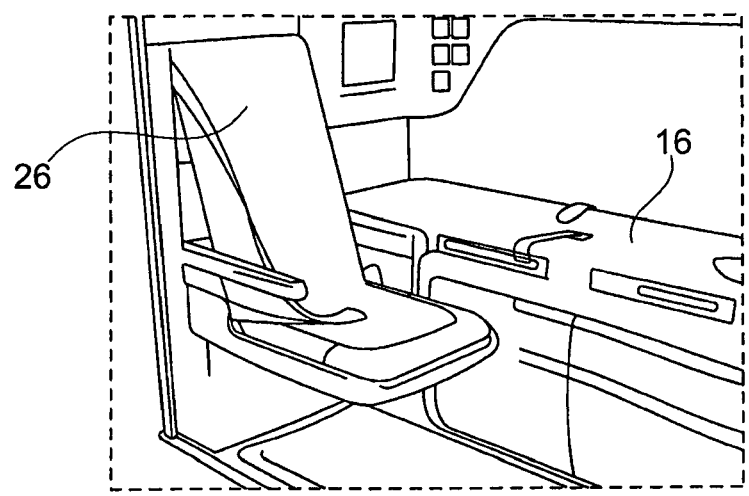
FIG. 14 is a seat for a medical attendant inside the device.
Figure 15:
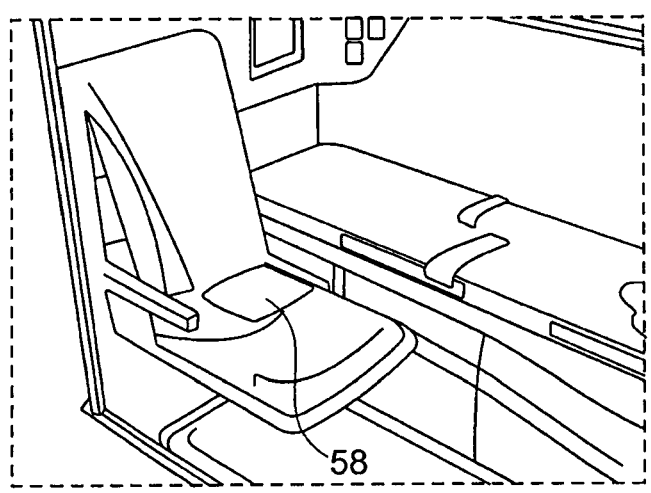
FIG. 15 is the seat according to FIG. 14 with folded-out eating tray.
Figure 16:
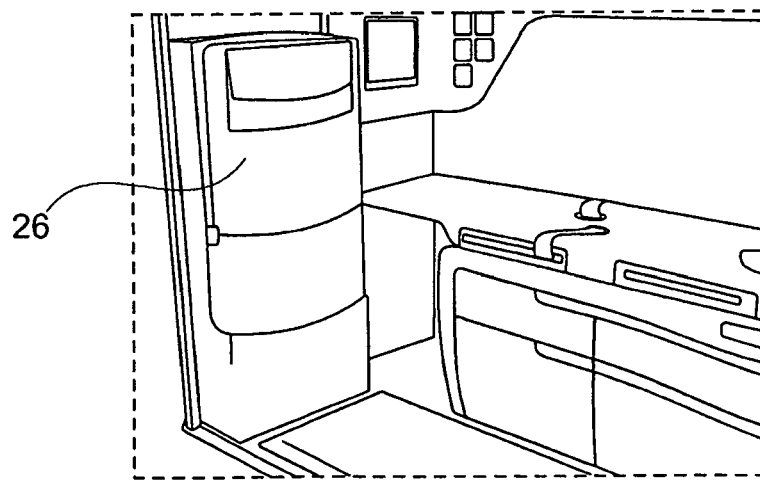
FIG. 16 is the seat according to FIG. 14 folded up.

The seat 26 for accommodating a medical assistant arranged inside the compartment has armrests and the same additional functions as a conventional passenger seat, e.g., an eating tray 58 that can be folded out of the armrest, see FIGS. 14 and 15. As shown on FIG. 16, the seat 26 can be folded up when not in use in order to free up space and go easy on the seat upholstery. The various positions of the seat 26, e.g., including a position with more sharply inclined backrest, can be temporarily locked in place via sliding latches.

Figure 17:
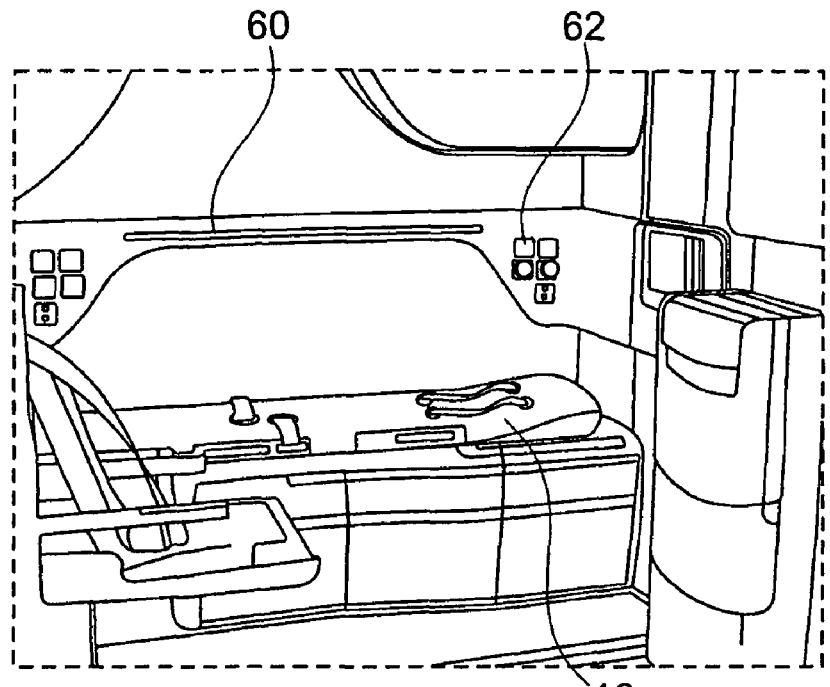
FIG. 17 is the inside of the device with an installation zone above the stretcher.
Figure 18:
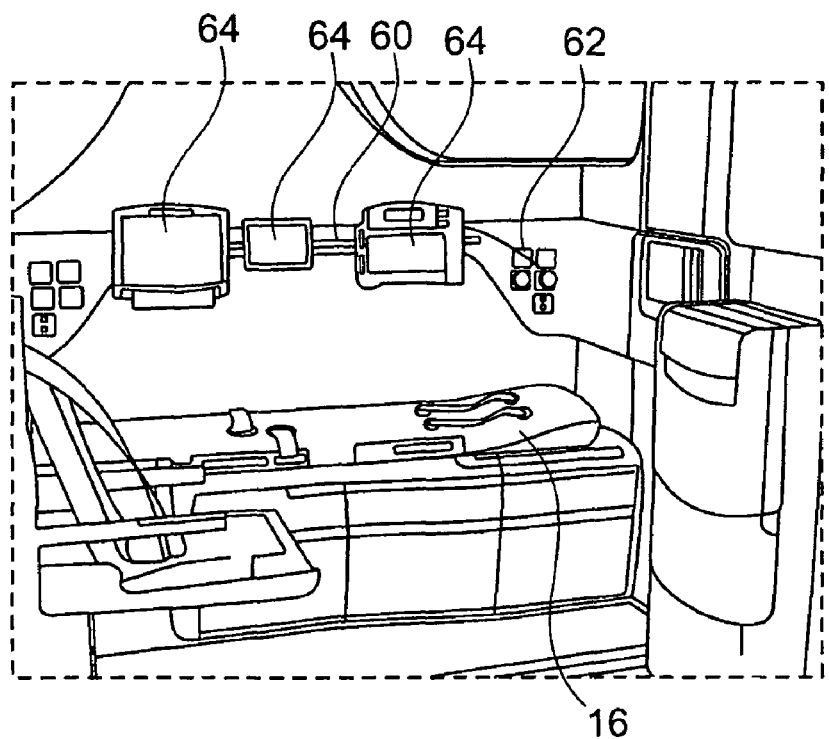
FIG. 18 is the installation zone according to FIG. 17 with medical devices.

In order to be able to secure and connect the needed medical devices in direct proximity to the patient as required by the respective application, an installation zone 60 is provided with fixation means for the various medical devices and supply ports 62 for current, oxygen and/or data transfer above the stretcher 16, see FIG. 17. FIG. 18 shows an example of the attachment and installation of different devices 64.

Figure 19:
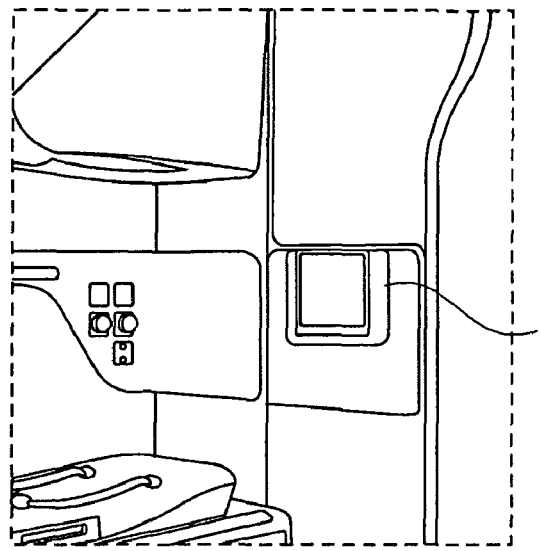
FIG. 19 is a telemedical unit on the interior wall of the device.
Figure 20:
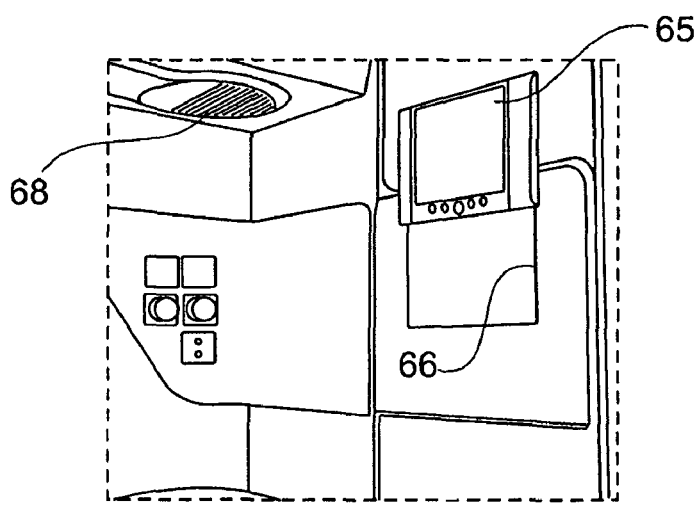
FIG. 20 is the telemedical unit for removal from a mount.
Figure 21:
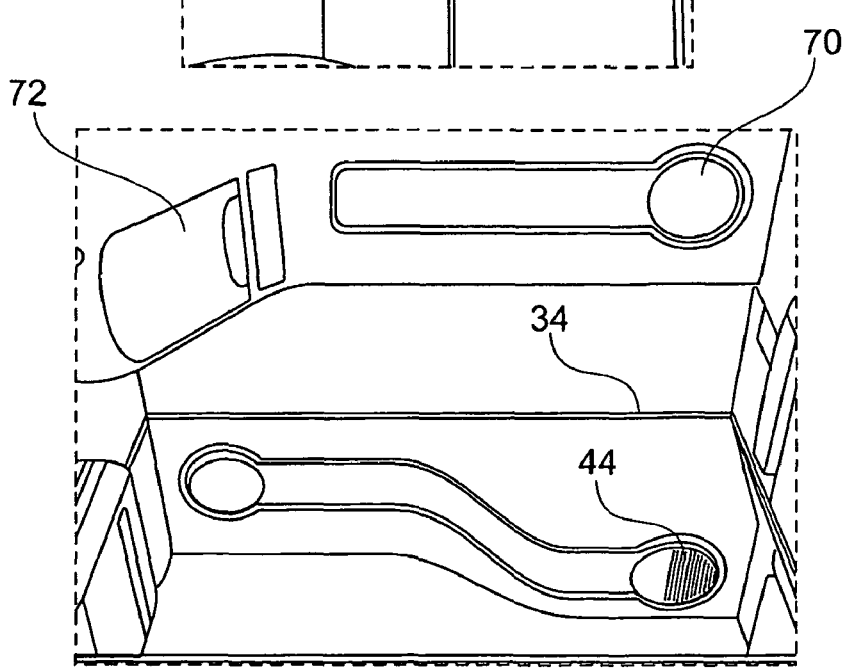
FIG. 21 is a view of the cover inside the device.

A so-called telemedical unit 65 is provided for communication and transmission of patient data, detachably held in mounts 66, and can be removed when required (see FIGS. 19 and 20), wherein attachment to the seat 26 is also possible. Of course, the device 12 has special lighting and ventilation systems. FIG. 21 shows the integration of a vent outlet and lighting unit in a ceiling element 68 above the stretcher 16, wherein a similar element 70 is also arranged above the zone of movement of the medical assistant. The lighting unit has modes for direct and indirect lighting, along with various color modes. The compartment incorporates an overhead compartment 72 for the medical assistant, in which he or she can stow personal items. A reading lamp (not shown) is provided for the attendant. Of course, oxygen masks and other first-aid equipment is provided for both the patient and assistant. In addition, the ceiling area integrates a camera for telemedical monitoring of the patient.

Figure 22:
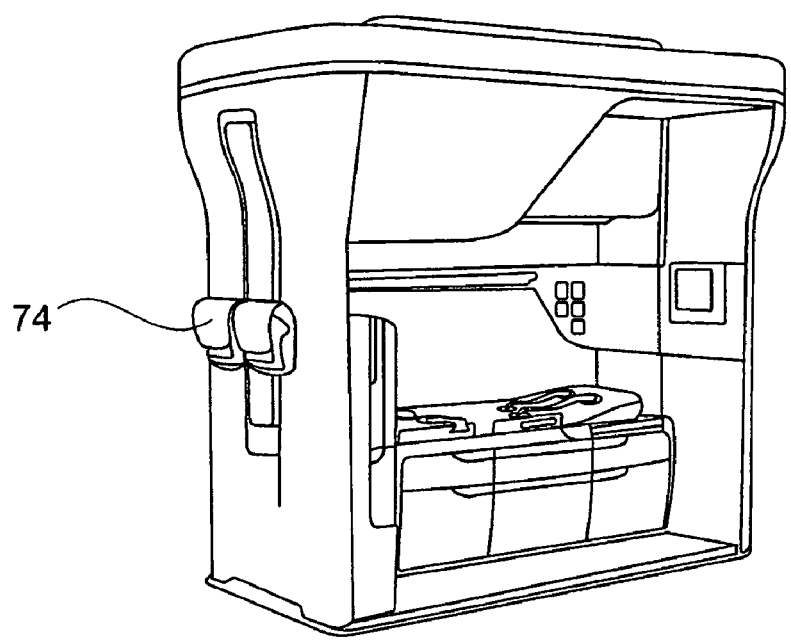
FIG. 22 is a tissue dispenser provided outside on a lateral wall.
Figure 23:
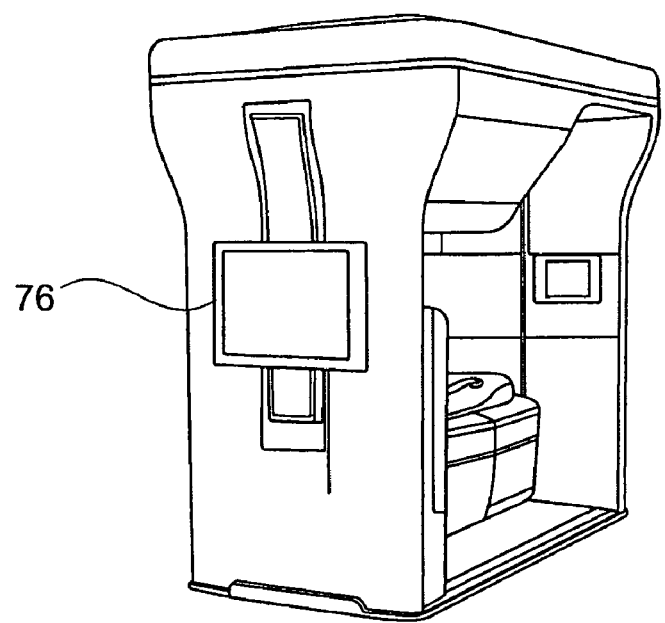
FIG. 23 is a display integrated outside in the lateral wall.
Figure 24A:
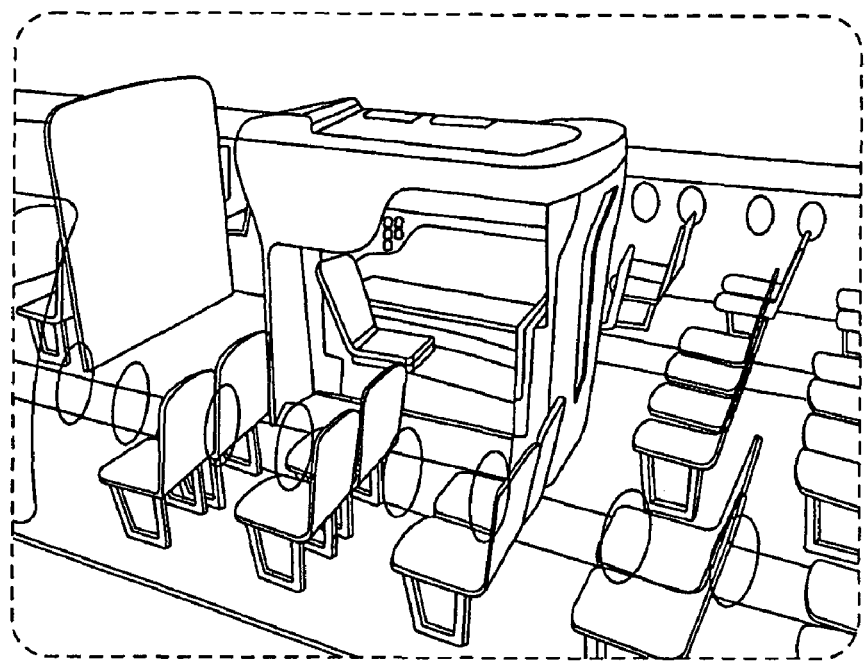
FIG. 24a is a perspective view of a passenger cabin with built-in device.
Figure 24B:
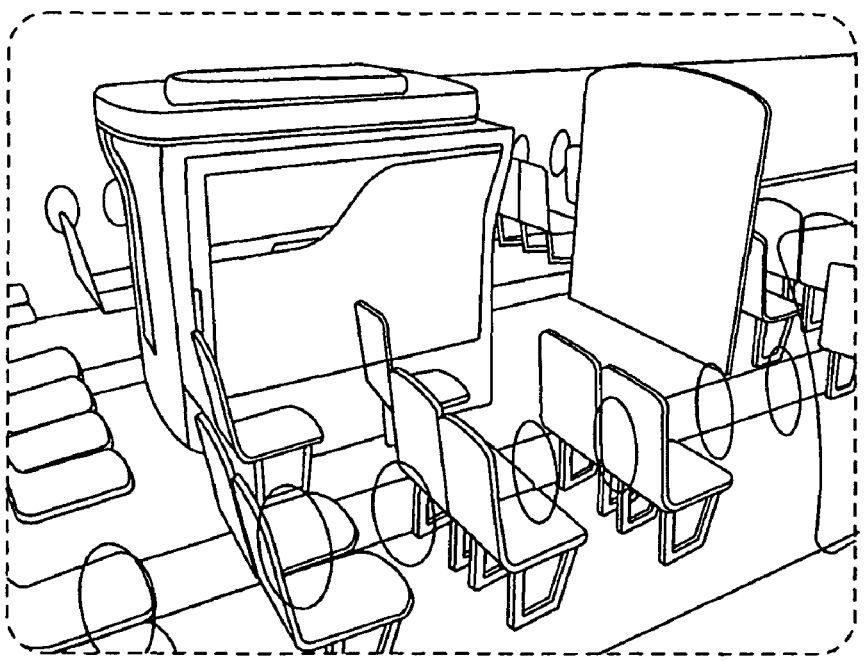
FIG. 24b is another perspective view of the device according to FIG. 24a from another side.
Figure 25:
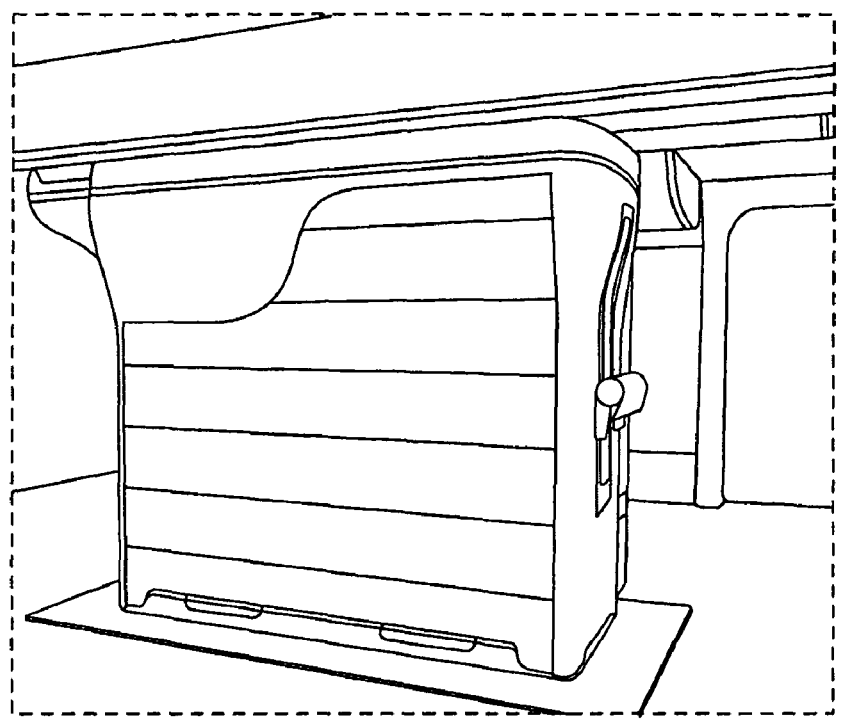
FIG. 25 is another perspective view of the device with rolled-down separator.
Figure 26:
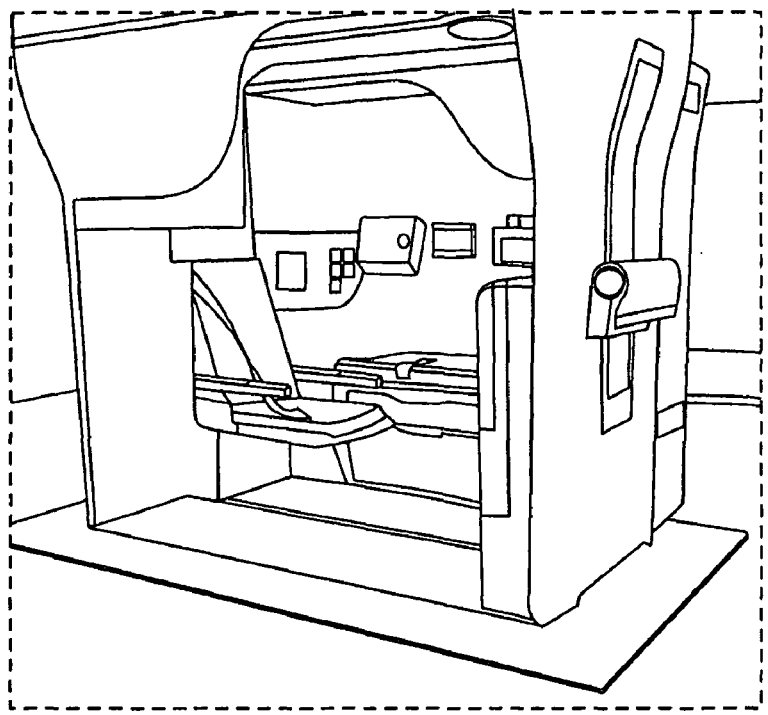
FIG. 26 is the device according to FIG. 25 with open separator.
Figure 27:
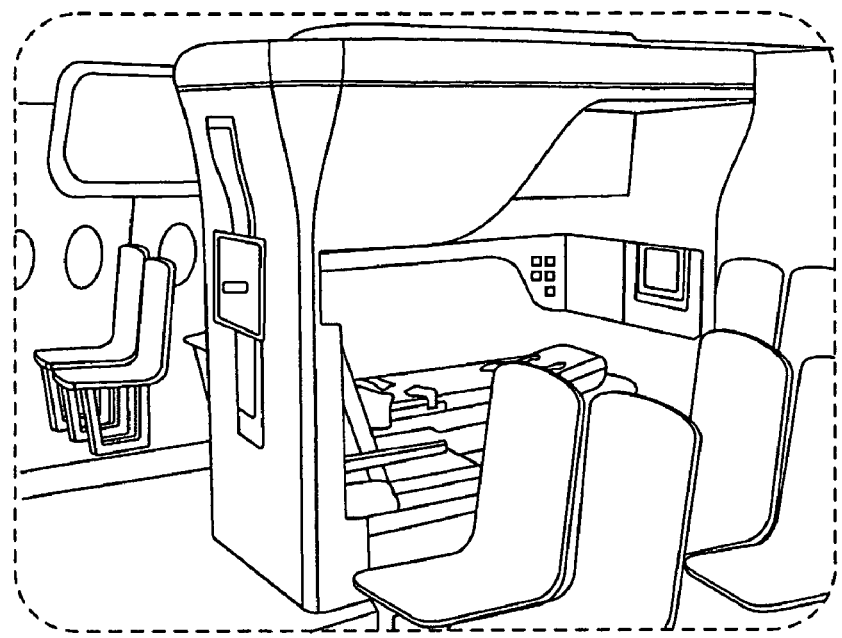
FIG. 27 is another perspective view of the device in the first mode.
Figure 28:
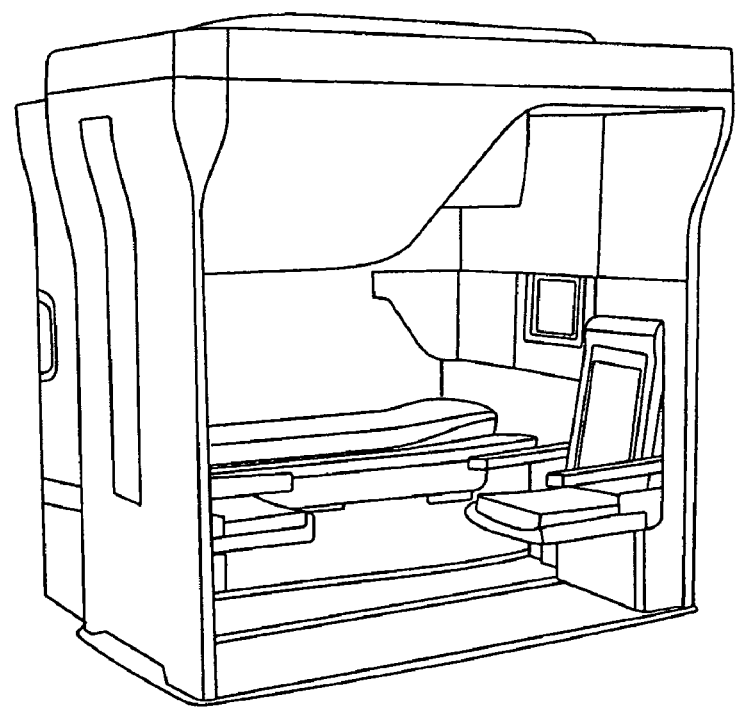
FIG. 28 is the device according to FIG. 27 in the second mode.
Figure 29:
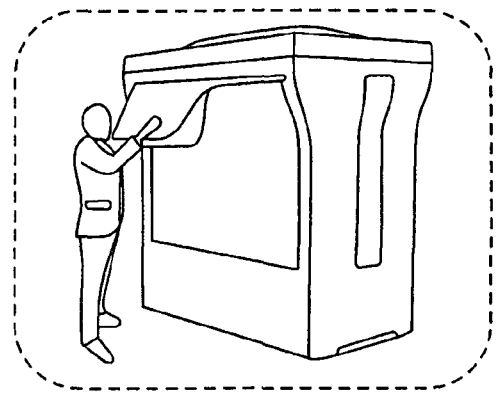
FIG. 29+30 is the use of an overhead storage compartment.
Figure 30:
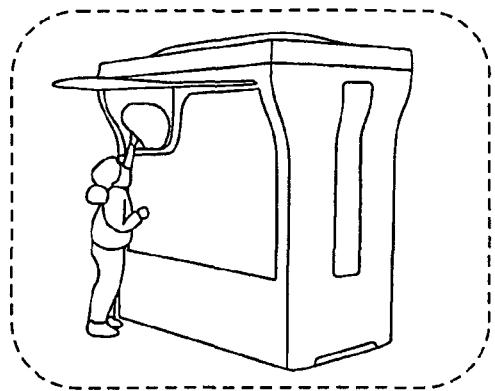
Figure 31:
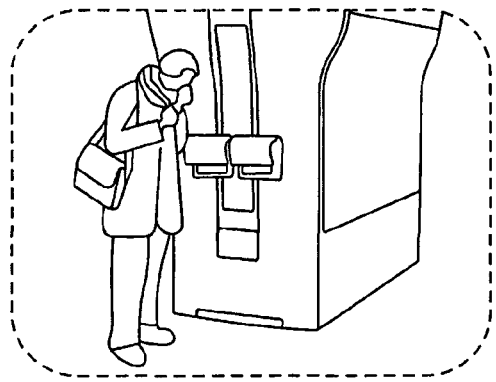
FIG. 31 is a tissue dispenser according to FIG. 22 secured to the outside of the device.
Figure 32:
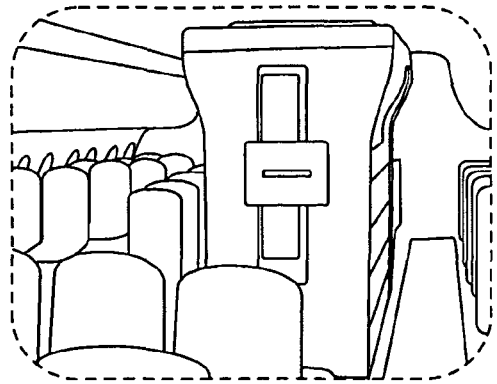
FIG. 32 is a display according to FIG. 23 secured on the outside of the device.
Figure 33:
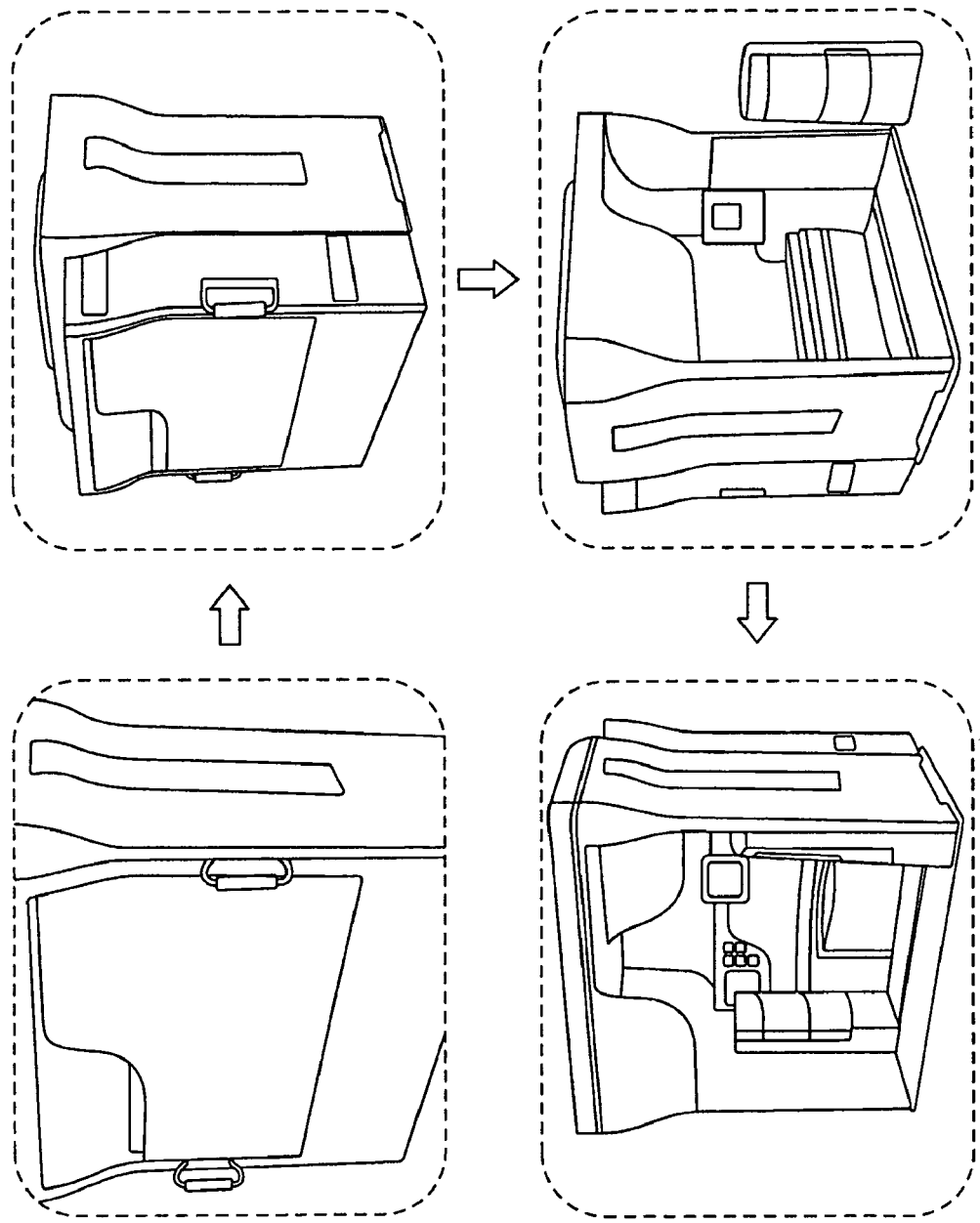
FIG. 33 is a schematic view of the various modes.
Figure 34:
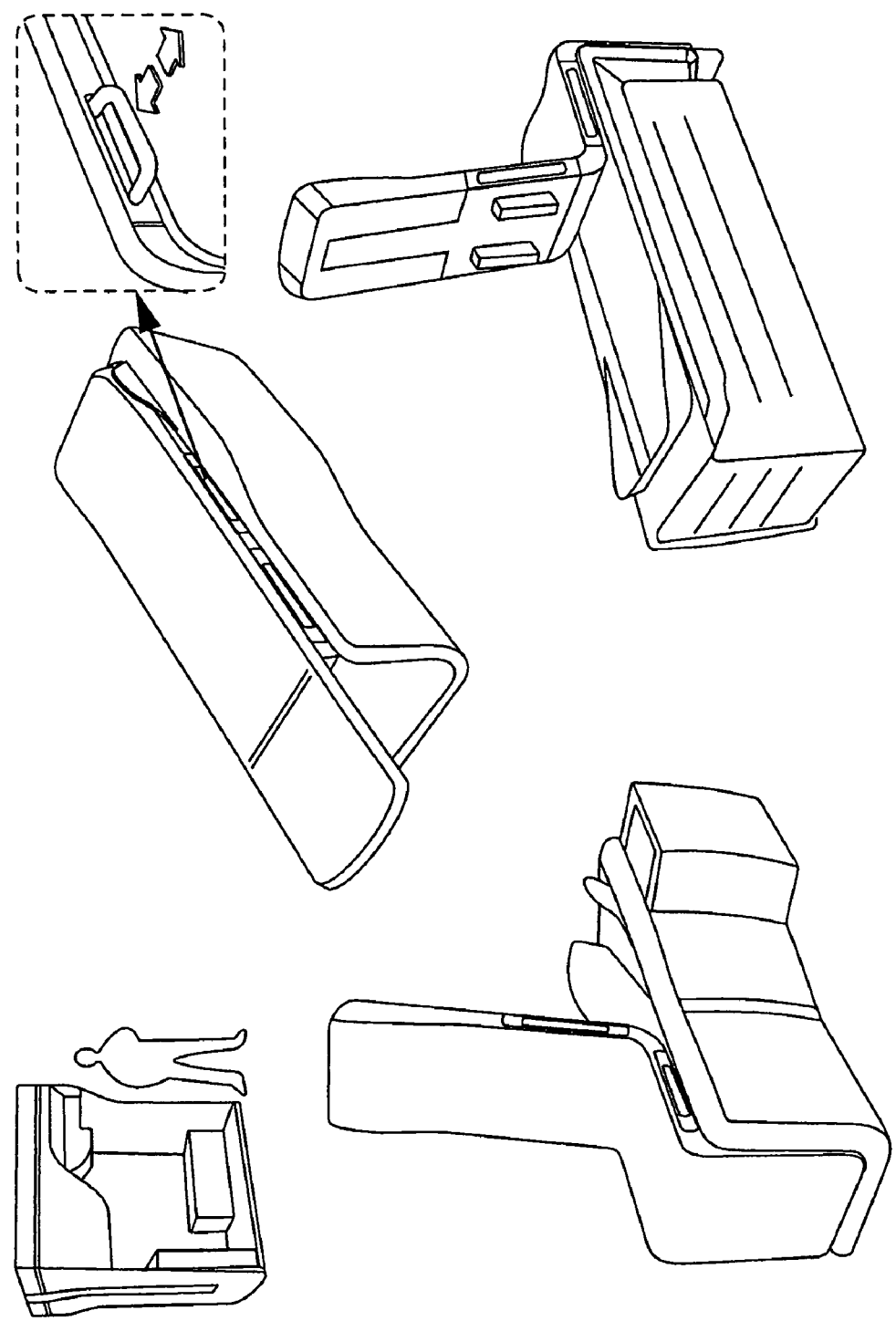
FIG. 34 is a stretcher according to the invention in various states.
Figure 35:
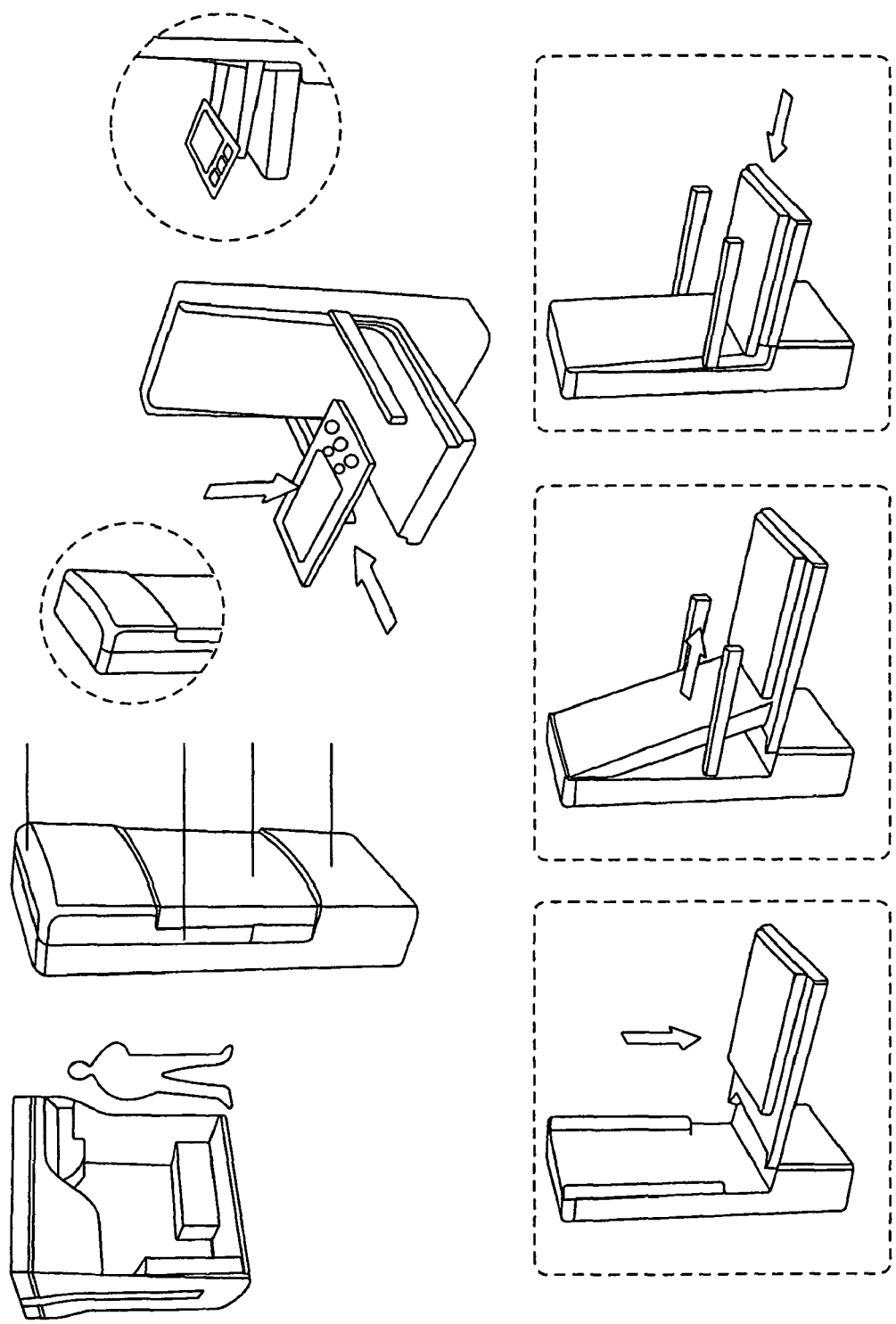
FIG. 35 is a seat according to the invention for the medical attendant in various states.

In order to achieve an extra use (second use) and optimize comfort for the remaining passengers via the compartment, the lateral elements 18, 20, 22, 24 can be expanded to include customer-oriented extra functions on the surface facing the passenger cabin. For example, tissue dispensers 74 can be provided on the lateral section 22 (see FIG. 22). Another extra function is shown on FIG. 23, where a display 76 visible from the passenger cabins is integrated into the lateral section 22. A so-called mood-light strip 78 is provided to visualize the occupancy status.

Of course, the materials and colors of the surfaces of the device 12 can be tailored to the layout and design concepts of the different airlines.

FIG. 24*a* to 35 show additional images of the device according to the invention and its mentioned characteristics and features, wherein reference is hereby expressly made to the images as well. The descriptions of FIG. 1 to 23 can be carried over analogously to FIG. 24*a* to 35.

Additionally, it is to be noted, that "comprising" does not exclude other elements or steps and that "a" or "an" does not exclude a plurality of elements. Further, it is to be noted that the features or steps which have been described in correspondence with the above embodiments can also be used in combination with other features and steps of other embodiments described above. Reference signs in the claims are not to be interpreted as limiting the scope of protection.

The invention claimed is:

1. A device for the transport and medical care of a patient as well as for the provision of emergency medical care in an aircraft, which device can be permanently installed inside the passenger cabin of an aircraft, comprising:
   a stretcher and medical care equipment, and
   lateral elements adapted to at least partially shield the patient from the environment,
   wherein the device is enveloped on all sides by the lateral elements and forms a separated compartment relative to the passenger cabin,
   wherein, when the compartment is installed inside the passenger cabin of the aircraft, the volume of the compartment can be temporarily enlarged by shifting at least one lateral section of the lateral elements between a first, emergency medical care mode, and a second, expanded mode for patient transport, wherein the stretcher is horizontally arranged within the compartment in the first and second modes such that the patient can be received on the stretcher, and such that space is available for a medical assistant inside the compartment.

2. The device of claim 1, wherein the at least one lateral section is a translatorily movable pull-out element, and the stretcher is arranged parallel to the pull-out element and can move in conjunction with the pull-out element.

3. The device of claim 1, wherein the at least one lateral section can be latched in the expanded state.

4. The device of claim 1, wherein the lateral elements can be secured to the structure of the aircraft.

5. The device of claim 1, further comprising a ceiling element that can be secured to the structure of the aircraft, and at least one of a power supply, oxygen supply, air conditioner and data exchange ports.

6. The device of claim 1, wherein the stretcher is equipped with a system of belts and straps for the patient, which enables unlimited resuscitation with the patient strapped in.

7. The device of claim 6, wherein the patient belt and strap system is divided into two parts.

8. The device of claim 1, wherein the stretcher is continuously adjustable between a flat position for accommodating a prone patient and an upright position for accommodating an uprightly seated patient.

9. The device of claim 1, wherein the stretcher is removable from the compartment with a patient strapped thereto.

10. The device of claim 1, wherein the stretcher is secured to a substructure, which has a removable storage area for medical equipment.

11. The device of claim 1, further comprising an installation zone with fixation devices for medical devices and with supply hookups for power, oxygen and/or data transfer above the stretcher.

12. The device of claim 1, wherein a telemedical unit is provided for communication and transmission of patient data.

13. The device of claim 1, wherein an overhead compartment is provided, which can be accessed from the passenger cabin.

14. The device of claim 1, wherein at least one seat is provided for accommodating a medical assistant inside the compartment.

15. The device of claim 1, wherein access to the compartment is gained by way of the side opposite the shiftable side.

16. The device of claim 2, wherein a lateral element opposite the stretcher has a first movable separating element that extends over a majority of the side.

17. The device of claim 16, wherein a second movable separating element is provided inside the compartment, which runs parallel to the side of the pull-out element, and separates the stretcher and medical devices from the access area.

18. The device of claim 1, wherein the lateral elements are expandable to include customer-oriented extra functions on their surface facing the passenger cabin.

19. The device of claim 18, wherein a display visible from the passenger cabin is integrated in one of the lateral elements.

* * * * *